C. A. LAISE.
METHOD OF WELDING LOW MELTING POINT METALS AND ALLOYS TO HIGH MELTING POINT METALS.
APPLICATION FILED SEPT. 15, 1919.
1,390,243.
Patented Sept. 6, 1921.
2 SHEETS—SHEET 2.
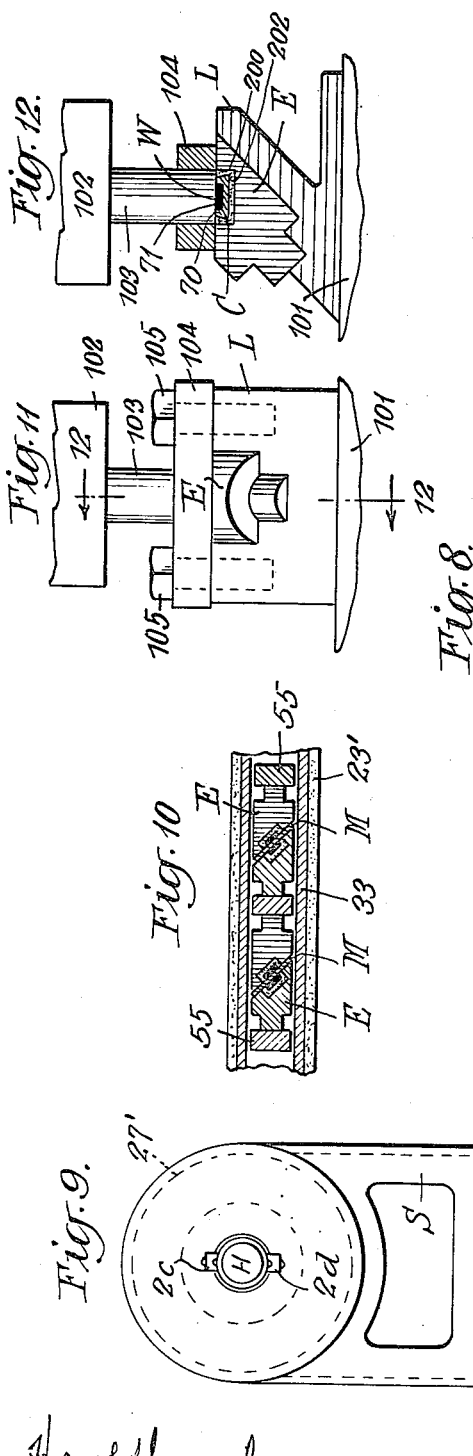
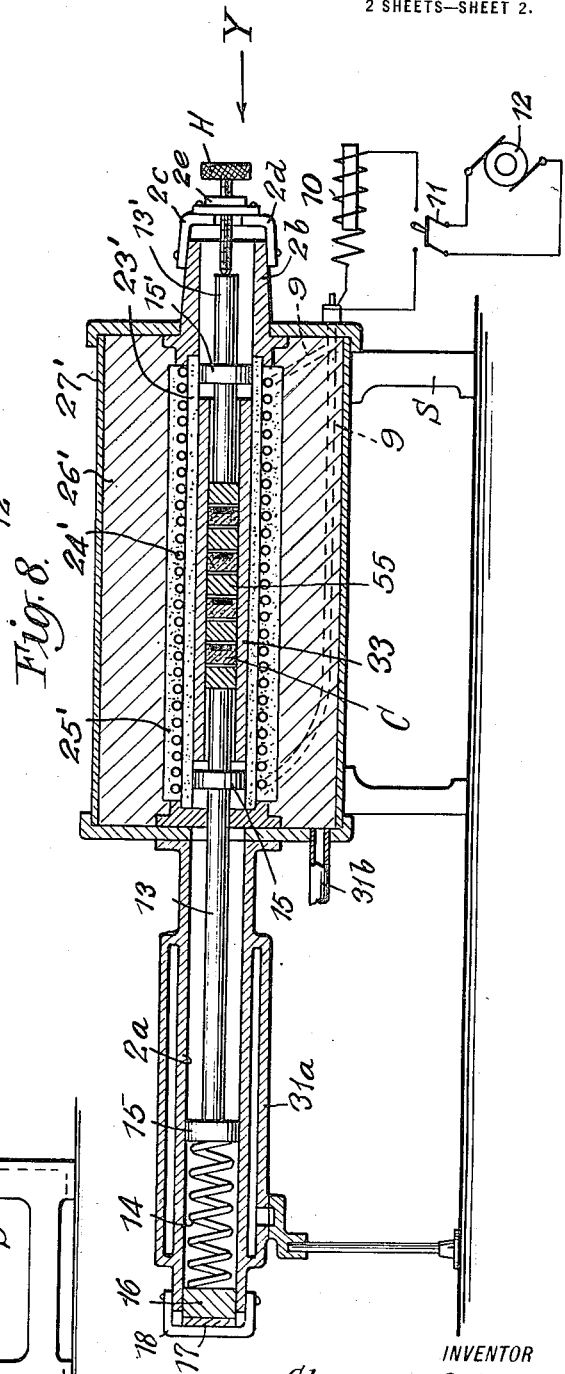
INVENTOR
Clemens A. Laise
BY
ATTORNEY

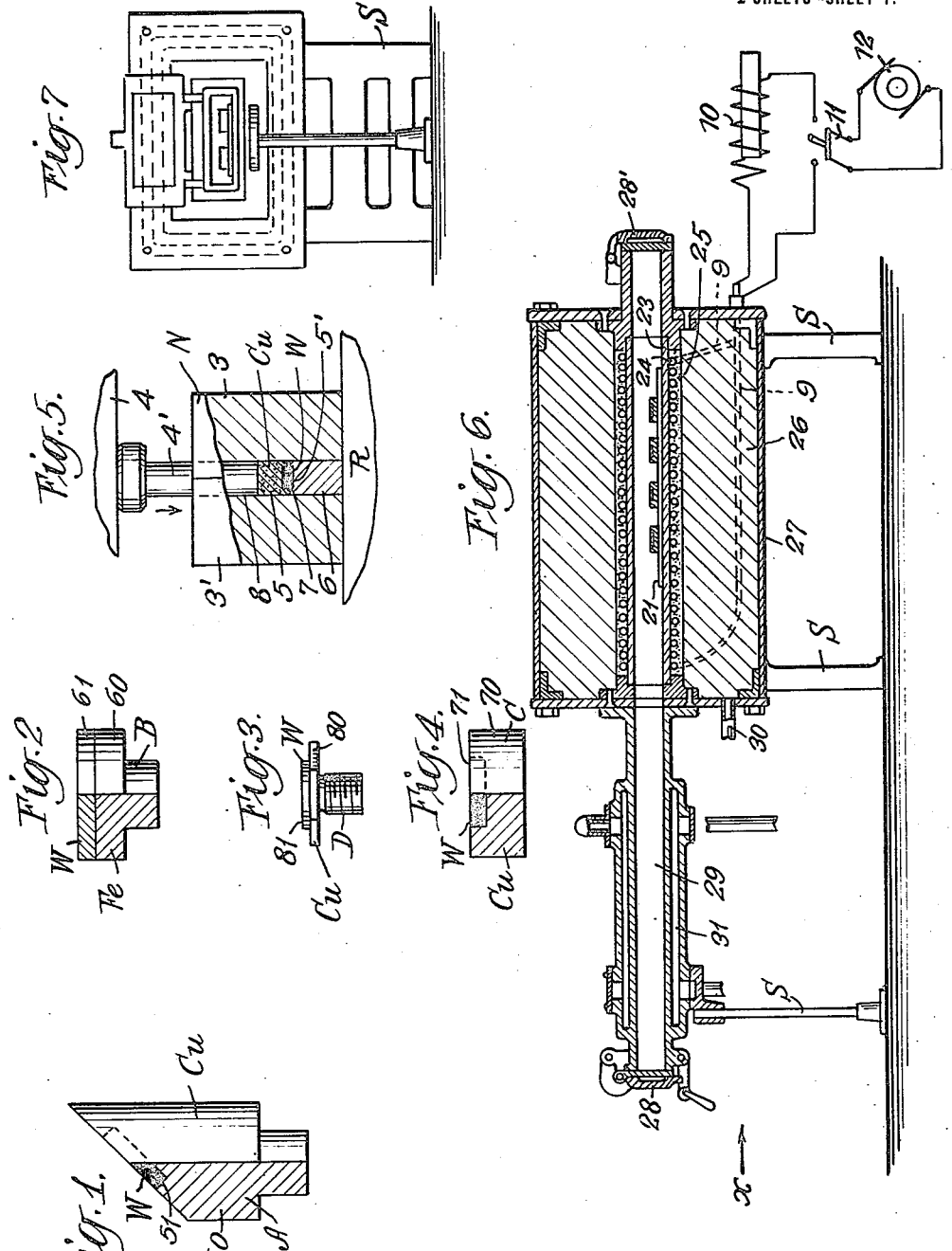

UNITED STATES PATENT OFFICE.

CLEMENS A. LAISE, OF WEEHAWKEN, NEW JERSEY, ASSIGNOR, BY MESNE ASSIGNMENTS, TO GENERAL ELECTRIC COMPANY, OF SCHENECTADY, NEW YORK, A CORPORATION OF NEW YORK.

METHOD OF WELDING LOW-MELTING-POINT METALS AND ALLOYS TO HIGH-MELTING-POINT METALS.

1,390,243.   Specification of Letters Patent.   Patented Sept. 6, 1921.

Application filed September 15, 1919. Serial No. 323,957.

*To all whom it may concern:*

Be it known that I, CLEMENS A. LAISE, a citizen of the United States, and a resident of Weehawken, county of Hudson, State of New Jersey, have invented certain new and useful Improvements in Methods of Welding Low-Melting-Point Metals and Alloys to High-Melting-Point Metals, of which the following is a specification.

This invention relates generally to a method of welding metals and alloys of metals which have a low melting point to metals and alloys of metals which have a high melting point.

More particularly the invention relates to a method of welding metals such as copper or alloys thereof to tungsten or molybdenum or alloys thereof.

The object of the invention is to devise a step or series of steps, from the performance of which upon such metals a complete and perfect product will result without actually either melting the metals in the ordinary way or subjecting the low melting point metals to special chemical treatment during the process for the prevention of blow holes.

The products ordinarily produced by my process are radio targets, X-ray targets and electric make and break contacts as well as other similar products having face plates of wrought tungsten and a backing of other metals of much lower melting point than that of tungsten. It is a fact well appreciated by those skilled in the art that tungsten because of its extremely high melting point and low vaporization point is especially adapted for the face plates of these products.

In manufacture of radio and X-ray targets, copper is usually utilized as the metal from which to form the backing or supports for the face plates of tungsten; and in the production of make and break contacts, iron or steel is usually employed as the backing for the tungsten face plates.

In describing my invention, in the interest of clearness, I will confine myself to the two metals, copper and tungsten. Although the invention relates specifically to the welding of tungsten to copper, it is to be understood that the same procedure is well adapted for the welding of tungsten or molybdenum or their alloys to metals of lower melting point. For instance, the process can be applied by using a copper nickel alloy, say of 50 per cent. copper and 50 per cent. nickel, in the place of the copper and the metal molybdenum, or an alloy of tungsten and molybdenum in the place of tungsten. So also the invention can be carried out by the substitution of iron or steel for the copper in forming a backing to be welded to a face plate of either tungsten or molybdenum or a tungsten molybdenum alloy.

So also such metals as nickel, gold, platinum, etc., can be welded, according to my process, to tungsten, molybdenum or tungsten molybdenum alloy should such a product be desired.

Reverting now, in the interest of clearness, merely to copper and to tungsten, the invention will be described with special reference to the welding of copper to tungsten. It is a well known fact that copper cast in the ordinary way is usually full of blow holes and that it is only by means of a special chemical treatment that it is possible to avoid blow holes in the cast copper. The chemical treatment is usually carried out by the introduction into the copper of some boron sub-oxid or some other deoxidant while the copper is in a state of fusion, just before the same is poured into the mold in order to form the product into the shape desired. Even when exercising the greatest possible care experience has shown that copper castings produced by the ordinary method above mentioned will contain holes. Consequently, it has not heretofore been possible to produce X-ray or radio targets whether the face plate be of tungsten or not, the copper backing of which is free from holes.

The porous copper or blow holes in the copper are especially detrimental when found near the welding juncture between the copper and the tungsten face plate, and it is a well known fact that in most cases these holes or pores are found directly under the tungsten face plate.

When holes or pores exist under the tungsten face plate in radio or X-ray targets or in electric make and break contacts, local heating is produced, when these products are in use, due to the fact that there is more electrical resistance to produce heat; and there is no copper, or steel or iron, as the case may be, to conduct away the heat, and this causes crystallization of the tungsten and subsequent fusion or rapid disintegration. These defects frequently exist in the ordinary castings constituting the backing of X-ray and radio targets and make and break contacts.

I have invented a process whereby these detrimental factors are eliminated and this process will now be particularly described so that any person skilled in this art can carry out the same and produce a product which for all practical purposes is perfect, and consequently meets the requirements demanded of it.

This application is a continuation in part of my application Serial No. 312,699, filed July 23rd, 1919.

In the drawings constituting a part of this specification:

Figure 1 illustrates, partly in section and partly in elevation, an X-ray target of tungsten with a copper backing.

Fig. 2 is a similar view of a make and break contact of tungsten with an iron or steel backing.

Fig. 3 is an elevation of a radio target with a tungsten face plate.

Fig. 4 illustrates, partly in section and partly in elevation, an unfinished radio target.

Fig. 5 is a view, partly in elevation, partly in section, and partly broken away, of a mold such as I have found efficient for use in carrying out my process.

Fig. 6 is a vertical cross section of an electric furnace which I have found especially efficient for carrying out certain steps of my process.

Fig. 7 is an end view in elevation of the said furnace looking in the direction of the arrow $x$ in Fig. 6.

Fig. 8 is a vertical cross section of another form of furnace which I have found efficient for carrying out the combined heat and pressure steps of my process.

Fig. 9 is an end elevation of said furnace looking in the direction of the arrow Y in Fig. 8.

Fig. 10 is a sectional detail showing the arrangement of X-ray targets in the electric furnace.

Fig. 11 is a front view of a pressing device for forming an X-ray target.

Fig. 12 is a section on line 12—12 of Fig. 11.

The products and apparatus illustrated in the drawing will here be more specifically described before entering upon a description of the process constituting my invention, as the result of which process, the products are produced, and in the carrying out of which process the apparatus illustrated may be utilized.

In the drawings, A is an X-ray target consisting of a copper backing 50 and a tungsten face plate 51. B is a form of electric make and break contact consisting of an iron or steel backing 60 and a tungsten face plate 61. C indicates an unfinished target in which 70 is the copper backing and 71 the tungsten face plate. D is a finished target showing the copper backing 80 having a screwthreaded stud formed thereon and projecting therefrom, and a tungsten face plate 81 (radio target).

Referring more particularly to Fig. 5, N is a split mold provided with sections 3 and 3', the said mold having an aperture 8 extending therethrough and a plug 6 filling the lower part of said aperture, the plug being slightly countersunk on its face at 7, for the purposes hereinafter described.

The copper from which the backing is to be formed is indicated at 5 and the tungsten face plate at 5'. R indicates the hydraulic ram upon which the mold rests and 4 the hydraulic press which operates in the direction shown by the arrow upon the plunger 4'.

One form of electric furnace is shown in Figs. 6 and 7 and another form is shown in Figs. 8 and 9, both of which are mounted upon standards S.

The furnace of Figs. 6 and 7 consists of a cast iron housing 27, preferably rectangular in cross section, substantially filled with ground or granular magnesite 26 embedded through the center of which is an oblong alundum or crystollon muffle 23 wound with any suitable heating wire 24 and covered with alundum cement 25, all of which as stated is surrounded by the magnesite 26 and incased in the iron housing 27.

A cooling chamber 29 into which the hot welded products pass from the furnace and which is therefore connected to the furnace in any suitable manner, is shown. The furnace is closed at each end by small doors 28 and 28' and the cooling chamber is provided with a surrounding water jacket 31, as shown. 30 indicates a pipe by means of which hydrogen passes to the furnace.

The furnace of Figs. 8 and 9 consists of a cast-iron housing 27', preferably circular in cross section substantially filled with ground or granular magnesite 26' embedded through the center of which is an alundum tube 23' wound with a heating coil 24' of any suitable metal or alloy and covered with alundum cement 25', all of which, as stated, is surrounded by the magnesite 26' incased in the iron housing 27'.

In both furnaces electric connections 9 are utilized which are suitably connected in circuit with a choke coil 10 double pole switch 11 and an A. C. generator 12.

A carbon tube 33 is situated within the alundum tube 23' and within this tube are arranged the products C shown in Fig. 4, or the products E as shown in Fig. 12.

Suitably mounted for reciprocatory movement within the furnace are compression rods 13 and 13' of cold rolled steel or nichrome, the front compression rod 13 being provided with guide collars 15 and the rear compression rod 13' having a guide collar 15'. The compression rods are mounted within the electrical furnace as shown, the guide collar 15' of the rear compression rod being mounted within and engaging with the inner wall of the alundum tube, one of the guide collars of the front compression rod being also mounted to engage with the inner wall of the alundum tube, the other collar fitting within a tube 2$^a$ secured in any suitable way to the furnace and projecting therefrom, which tube is provided with a water jacket 31$^a$. A compression spring 14 fits within the tube and engages against the outer guide collar 15 and a rubber plug 16 mounted in the end of the tube, the structure being held in place by a suitable wedge 17 engaging against the rubber plug 16 by means of a lock hinge 18.

Projecting from the furnace at the opposite end thereof is a tubular fitting 2$^b$ to which are secured arms 2$^c$ and 2$^d$, to which arms is secured a cap 2$^e$, which holds in any suitable manner a compression adjusting screw H, the end of which engages with the compression rod 13' so that upon turning the screw H the pressure may be regulated upon the products in the furnace undergoing sintering and alloying. Carbon spacing plugs 55 are alternately arranged between the products C. 31$^b$ indicates a hydrogen inlet pipe passing into the furnace.

In Fig. 10 is shown the arrangement by means of which the X-ray target may be placed within the furnace and subjected to the sintering and welding operation under heat and pressure. In this arrangement the faces of the two targets abut each other and between them are placed thin disks M of mica or carbon.

I have discovered that when finely powdered copper is pressed by very high pressure, against a body or disk of tungsten to which the copper is to be welded and this compressed compound body is then sintered at a high temperature near to or at the melting point of copper, a perfect weld or joint is produced between the copper and the tungsten especially if the latter has been previously electro-plated with a thin film, and the mass of copper so treated is free of blow holes and has a specific gravity of approximately the same as ordinary copper.

My method further affords decided advantages over other methods using molten copper, especially in the manufacture of X-ray and radio targets which are provided with a copper backing, in view of the fact that it is a comparatively simple matter to press metallic powder into the shape of the desired finished product and at the same time, owing to the high pressure, produce a perfect joint and subsequent weld between the tungsten and the copper.

Chemically pure copper powder is produced by the ordinary methods known in the art; that is, either by precipitating the copper oxid and reducing it in hydrogen or by electrolyzing the copper solution so that spongy copper is precipitated. This fine powder is sifted through a 200 mesh sieve and again carefully reduced in hydrogen at a temperature of from 400 degrees C. to 600 degrees C. This chemically pure copper powder so produced is then ready for use in my process.

Tungsten disks or cylinders or other desirable shapes are produced in the manner well known in the art by mechanically working the metal tungsten into suitable shapes for cutting or stamping the face plates into the shape desired. These tungsten bodies are then cleaned either in ammonia and peroxid or in a hydrogen furnace, or both methods of cleaning may be employed.

These cleaned tungsten disks or cylinders are then electroplated with gold or with copper, or with any metal that will wet the surface of the tungsten on heating to higher temperatures. For plating the tungsten with copper I prefer to use a copper sulfate electrolyte, the latter being prepared by dissolving 16 gms. of chemically pure copper sulfate per liter of distilled water and adding 6 cc. of concentrated sulfuric acid to each liter. A current density of about 6 amperes per square foot at a voltage of $\frac{1}{4}$ v. to $\frac{3}{4}$ v. is used, the copper deposition taking place at a rate of about one mil per hour. The electrolyte is placed in a glass jar, using electrolytic copper plates as cathodes and anodes. The cathode is placed in a horizontal position so that the tungsten disks may be placed upon it to the end that their entire exposed surfaces are plated, that is to say, the entire surface is plated except the portion in direct contact with the cathode plate. In completing the product it is only necessary to machine the copper from the edge of the tungsten plate or disk when it is desired to make a product having the edge of the tungsten free.

It is preferable to carry out the first deposition very slowly so that the copper firmly adheres to the tungsten disk. In order to insure perfect adherence of copper to the tungsten, I cause a very thin film of copper to be deposited on the tungsten disk and then heat it up in a furnace similar to that shown in Figs. 6 and 7. For the purpose of so heating this compound disk, it is placed on a nickel or nichrome boat, the temperature to which said compound disk is subjected being sufficient to just melt and alloy the copper with the tungsten.

I have found it desirable to plate the copper to a thickness of about .004 to .010 inches, and if the film of alloyed copper and tungsten is at first too thin, this step is repeated again and again until the copper is effectively and uniformly alloyed over the desired portion of the surface of the tungsten disk to the proper thickness above mentioned.

It should be here stated that when a mixture of powdered platinum and powdered gold is utilized to form a base to which a tungsten plate is to be welded, I electroplate the tungsten disk with gold.

Having now a chemically pure copper powder and tungsten disks or plates carefully electroplated and alloyed over the entire area of one surface, I press the copper powder upon the tungsten disk as follows:

The cleaned tungsten disk W, free of grease is placed with the copper plated side up, into a mold N similar to that shown in Fig. 5, the lower plug 6 of which is slightly countersunk at 7 so as to centralize the tungsten disk and hold it in place. The shape of the plug 6 is determined by the shape of the finished article and also the size and type of the mold is determined by the type of finished article desired. In most cases I prefer to use a split mold consisting of sections 3 and 3' so that the pressed article can be more easily removed therefrom.

After the tungsten disk W is placed, I weigh out a calculated weight of copper powder 5 which when compressed will give about the size and shape of the finished article. This weight of copper powder 5 is placed into the mold N, the sections 3 and 3' thereof having been first brought together and compressed at about 40 to 50 tons per square inch pressure between the hydraulic ram R and the hydraulic press 4 and plunger 4'. The latter is slowly and gradually subjected to pressure until the gage indicates that about 50 tons per square inch are exerted upon the same. It usually requires one to two minutes to bring the pressure up to 50 tons and it has been found advantageous to maintain that pressure half a minute longer so as to make certain that the proper compression is obtained. The pressure is then released and the plunger 4' is withdrawn from the mold.

In case that a split mold is used, the sections 3 and 3' are taken apart, or if an integral mold is used, the plug 6 is forced out by tapping it gently and the compressed product is then sufficiently adherent and compact to permit of removal by hand.

The compressed products consisting of copper and tungsten are then placed on a nickel or nichrome boat 21, shown in Figs. 6 and 7, which are then placed in the electric furnace therein shown, which consists of an oblong alundum or crystollon muffle 23 wound with any suitable heating wire 24 and covered with an alundum cement 25 incased in a cast iron housing 27 and surrounded by a ground or granular magnesite 26.

The furnace is also provided with a cooling chamber 29 into which the hot welded products are pushed after sintering and welding. The entrance and exit to the furnace are provided with small doors 28 and 28' and hydrogen gas is passed into the furnace by means of the inlet 30 and fills the housing 27, percolates through the porous walls 23 of the alundum or crystollon tube and passes out through the openings at the ends of the tube when the doors 28 and 28' are open or past the crevices around the doors when they are closed. This furnace operates on a 220 v. circuit with a resistance in series for regulating the temperature.

Hydrogen gas is passed through the inlet 30 at a rate of about 30 cubic feet per hour and sufficient current is sent through the heating coil so that the furnace attains a temperature of 600 degrees C. in a period of 1¼ hours. This current is maintained for approximately ½ hour and then raised to 800 degrees C. and held there for approximately two hours, after which the temperature is raised to 850 degrees C. to 875 degrees C. and held at that temperature for about two hours. The welded compressed products are then pushed into the cooling chamber 29 and after 15 minutes are removed therefrom.

By this means the compressed objects are sintered and the copper is perfectly welded to the tungsten disk. The mass of copper treated by the above process can be worked and machined just like regular copper bars and it is entirely free from blow holes.

Since tungsten has a melting point upward of 3200 to 3400 degrees C. and crystallizes very little at a temperature less than 2000 degrees C. the quality and structure of the tungsten is not affected in the welding operation, and is therefore in perfect condition for use in the products described.

As stated, the copper being compact and not porous, it can be worked, machined and shaped into any desired form.

The process above described also furnishes an excellent means of alloying low melting point metals and welding them to high melting point metals in one operation. To illustrate, powdered copper and powdered nickel can be mixed together in any proportion, and this homogeneous mixture of metallic powder can be compressed against a disk either of tungsten or molybdenum, or their alloys, which disk has previously been copper plated, as above described, and the combined alloying and welding operation can be carried out in one step in the electric furnace.

I have found that a copper nickel alloy suitable for use as above described, may be formed by producing a homogeneous mixture of 50 per cent. copper powder and 50 per cent. nickel powder, which mixture is compressed against the disk of high melting point metal by high pressure and the sintering, alloying and welding of the compressed piece can be subsequently effected in a single step in the electric furnace.

The process can also be readily employed for the manufacture of tungsten contact points such as illustrated in Fig. 2, which consists of tungsten face plates and iron or steel backings to which the face plates are welded. This result is accomplished by first electroplating a large number of disks and then compressing the iron powder in a mold against the electroplated tungsten disk, and then sintering and welding these products in the electric furnace by passing them therethrough in large quantities.

The special feature of my process consists in the employment of very high pressure for compressing the low melting point metallic powders against high melting point metallic cylinders or disks, and then by means of sintering and welding process effect the juncture of the two metals, thus producing metallic bodies free of blow holes and pores, such as a body of copper and tungsten or a body of iron and tungsten which can be readily shaped into X-ray targets, radio targets, or make and break contacts as desired.

The process is especially advantageous for the production of solid metallic bodies for backings to be welded to tungsten or high melting point metals, since by this means a body of metal of high conductivity formed of either copper or iron and free of blow holes is obtained without melting the metal and without employing any deoxidizing agents, such as boron sub-oxid, etc., to prevent the formation of blow holes.

I have found that the maximum temperature of sintering and welding may be determined by first ascertaining the melting point of the particular metal powder which, when formed into a body by pressure is to be welded to the tungsten or molybdenum, and then utilizing substantially 85 to 90 per cent. of the melting point temperature as the maximum sintering and welding temperature.

The period of sintering is determined by noting the change in density of the metal and when the density no longer changes at a temperature approximating 85% of the melting point temperature of the pure metal, I have found that the sintering process is completed.

When alloying and welding in the same operation I have found it very desirable to make a preliminary run to determine the fusing or alloying point of the metals and then use a temperature approximating 85 to 90 per cent. of the fusing point as the maximum sintering temperature.

In effecting the welding and alloying, more particularly the welding, I find it is advisable to carry out the sintering and welding operations under pressure so that both heat and pressure are effective at the same time during the treatment of the products in the electric furnace. For this purpose I employ a pressing apparatus attached to a furnace, as illustrated in Figs. 8 and 9, by means of which the products during the heat treatment are subjected to pressure of not less than twenty pounds to the square inch.

A combined heating and pressing treatment may also be effected electrically by effecting the pressure between two electrodes.

The process as carried out in the furnace shown in Figs. 8 and 9, consists in placing the pressed tungsten copper bodies, such as made in accordance with the hereinabove description and particularly illustrated in Fig. 4, into the carbon tube 33. In doing this it is preferred to alternately place a pressed metal body C and a carbon disk or plug 55 into the carbon tube into which the compression rods 13 and 13' protrude, the latter being subjected to pressure through the compression spring 14. The compression rod 13' extends into the front end of the carbon tube, the pressure on the same being regulated by means of the adjusting screw H. Thus, as the pressed copper bodies C shrink or sinter together, the adjusting screw H is regulated so that the bodies in the furnace are subjected to a fairly uniform pressure throughout the sintering operation.

When sintering copper-tungsten X-ray targets it is preferred to use the general scheme shown in Fig. 10. In this case I find it desirable to use mica or carbon disks M between the faces of the X-ray targets.

In this electric furnace the bodies are generally subjected to a pressure of about 20 to 25 lbs. per sq. in. at a temperature of 900 degrees to 1000 degrees C. for a period of about one to three hours.

In Figs. 11 and 12 there is shown a mechanism by means of which my process of manufacturing X-ray targets may be carried out. These targets are formed by pressing the body consisting of the tungsten disk 71 and pressed copper powder 70, such as shown in Fig. 4, preferably slightly beveled as shown in Fig. 12, into a machined copper body of the target E. The copper body is formed by machining it into shape from a copper bar, as may be obtained on the market. It is then placed upon a seat L, which in turn is supported by the table 101 of the hydraulic press. 102 represents the hydraulic press stop engaging plunger 103, the said plunger being guided, and the said copper body E being held in place by a strap 104, secured by screws 105 to the seat L. The cavity 200 is formed in the machined copper body E so that the compressed plug C, as shown in Fig. 4, tapered a little for mechanical reasons, will snugly fit therein. The cavity 200 is first provided with a layer of copper powder 202 and the combined pressed copper and tungsten body C, as shown in Fig. 4, is then placed within the cavity upon the copper powder and the pressure is applied through the hydraulic press ram and plunger, the target body of copper being held in the mold or seat L while pressure is being applied.

I have also found that a successful product may be manufactured by utilizing a disk of tungsten alone, prepared as above described, and pressing it directly into the cavity 200 in the copper body E, the said cavity being first filled with copper powder.

These bodies of tungsten pressed into the copper are then placed into an electric furnace in the manner illustrated in Fig. 10, and subjected to a sintering process under pressure for a period of one to three hours, at a temperature of 900 degrees to 1000 degrees C., as heretofore described.

The sintering and welding operations are carried out either in vacuum or in an atmosphere of hydrogen.

It is to be understood that my invention is not limited by the exact figures mentioned above as to weights and temperatures, etc., but may vary therefrom and therefore the scope of the invention is to be determined only by the claims appended hereto.

Having thus described my invention what I claim as new and desire to secure by Letters Patent is:

1. The herein described process which comprises compressing powdered material of low melting point against a plate of material of high melting point and subsequently heating the two.

2. The herein described process which comprises plating a piece of material of high melting point with material of low melting point, pressing powdered material of low melting point against said piece and subsequently heating the two.

3. The herein described process which comprises plating a piece of material of high melting point with material of low melting point, pressing powdered material of low melting point against said piece and subsequently heating the two until they become welded together.

4. The herein described process which comprises plating a piece of material of high melting point with material of low melting point, pressing powdered material of low melting point against said piece and subsequently heating the two to a temperature near the melting point of the powdered material.

5. The herein described process which comprises plating a piece of material of high melting point with material of low melting point, pressing powdered material of low melting point against said piece and subsequently heating the two to a temperature of approximately 85 to 90 per cent of the melting point of the powdered material.

6. The herein described process which comprises plating a piece of material of high melting point with material of low melting point, pressing powdered material of low melting point against said piece at a pressure of about 50 tons per square inch and subsequently heating the two.

7. The herein described process which comprises plating a piece of material of high melting point with material of low melting point, pressing more of said material of low melting point in powdery form against said piece and subsequently heating the two.

8. The herein described process which comprises plating a piece of material of high melting point with material of low melting point, pressing powdered material of low melting point against said piece and subsequently sintering and welding the two.

9. The herein described process which comprises plating a piece of material of high melting point with material of low melting point, pressing powdered material of low melting point against said piece and subsequently sintering and welding the two in an atmosphere of hydrogen.

10. The herein described process which comprises plating a piece of material of high melting point with copper, pressing powdered copper against said piece and subsequently heating the two.

11. The herein described process which comprises plating a piece of high melting point metal with copper, pressing powdered copper against said piece and subsequently heating the two.

12. The herein described process which comprises plating a piece of high melting point metal with copper, pressing powdered copper against said piece under a pressure of about 50 tons per square inch, and subsequently heating the two to a sufficiently high temperature to weld the same.

13. The herein described process which comprises plating a piece of high melting point metal with copper, pressing a mixture of powdered copper and nickel against said piece and subsequently heating the product.

14. The herein described process which comprises plating a piece of high melting point metal with copper, pressing powdered copper against said piece and subsequently heating the two between 600 degrees C. and 875 degrees C. for about four hours.

15. The herein described process which comprises plating a piece of tungsten with copper, pressing powdered copper against said piece and subsequently heating the two.

16. In the process of welding metals of low melting points to metals of high melting points at temperature below the melting points of said low melting point metals, the step which consists in strongly pressing said low melting point metal in powdered form to a piece of said high melting point metal.

17. In the process of welding metals of low melting points to metals of high melting points at temperatures below the melting points of said low melting point metals, the step which consists in pressing a low melting point metal in powdered form to a piece of high melting point metal under a pressure of about 50 tons per square inch.

18. The herein described process which comprises compressing powdered material of a lower melting point against a solid piece of material of a higher melting point and subsequently heating the two while they are firmly pressed together.

19. The herein described process which comprises compressing powdered material of a lower melting point against a solid piece of material of a higher melting point and subsequently heating the two while they are pressed together with a pressure of approximately 25 lbs. per square inch.

20. The herein described process which comprises compressing powdered material of a lower melting point against a solid piece of material of a higher melting point and subsequently heating the two to a temperature of approximately 1000 degrees C. while they are firmly pressed together.

21. The herein described process which comprises compressing powdered material of a lower melting point against a solid piece of material of a higher melting point and subsequently heating the two under pressure for approximately two hours.

22. The herein described process which comprises heating powdered copper and a tungsten disk while they are firmly pressed together.

23. The herein described process which comprises heating powdered copper and a tungsten disk to a temperature of approximately 1000 degrees C. while they are pressed together with a force of approximately 25 lbs. per square inch.

24. The herein described process which comprises pressing a solid body of a higher melting point into a socket in a solid piece of material of lower melting point which socket contains powdered material of the lower melting point and subsequently heating the article so formed while maintaining the constituents firmly pressed together.

25. The herein described process which comprises pressing a disk of tungsten into a depression in a solid piece of copper containing powdered copper and subsequently heating the article so formed to a temperature of approximately 1000 degrees C. while pressing the tungsten and copper against each other with a force of approximately 25 lbs. per square inch.

26. The herein described process which comprises pressing a disk of tungsten into a depression in a solid piece of copper containing powdered copper and subsequently heating the article so formed to a temperature of approximately 1000 degrees C. while pressing the tungsten and copper against each other with a force of approximately 25 lbs. per square inch for a period of approximately two hours.

27. The herein described process which comprises compressing a base metal powder against a solid piece of high melting point metal and subsequently heating the two under pressure.

28. The herein described process which comprises compressing a base metal powder against a solid piece of tungsten and subsequently heating the two under pressure.

In witness whereof, I have hereunto set my hand at the borough of Manhattan, city and State of New York, this 9th day of September, 1919.

CLEMENS A. LAISE.

In presence of—
ISABEL R. FLETCHER.